United States Patent Office 3,452,810
Patented July 1, 1969

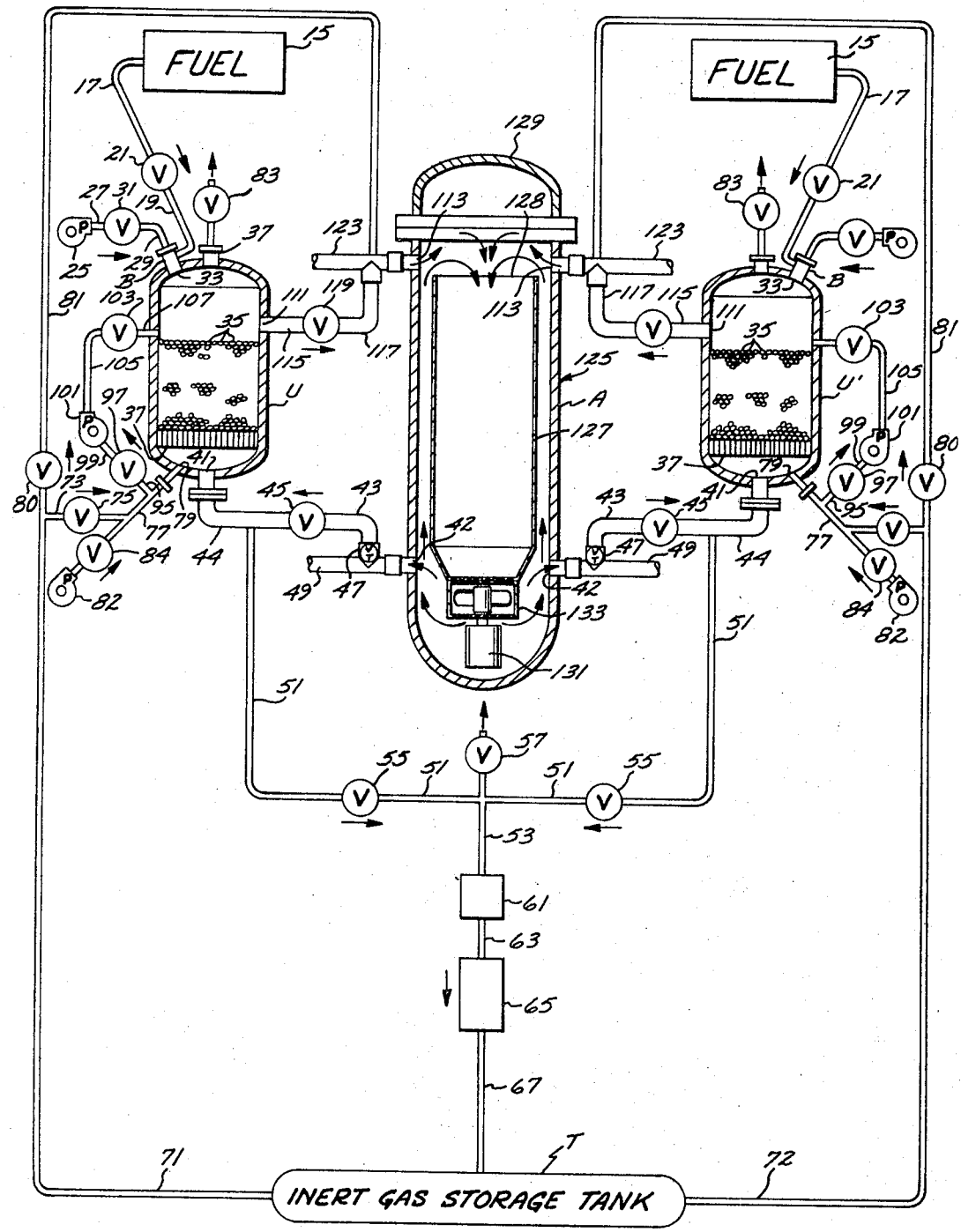

3,452,810
METHOD AND APPARATUS FOR CHARGING AN AUTOCLAVE WITH A HEATED INERT GAS
James H. Schmidt, Berkeley, and Warren W. Hedstrom, Rolling Hills, Calif., assignors to Fuel Engineering, Torrance, Calif., a corporation of California
Filed Jan. 23, 1968, Ser. No. 699,971
Int. Cl. F25b 13/00; F23l 15/02; F27d 17/00
U.S. Cl. 165—2          11 Claims

ABSTRACT OF THE DISCLOSURE

An autoclave system including an autoclave which is connected with a heat storage means and a gas storage means. A fuel burner is also connected with the one end of the heat storage means and generates hot inert gas. The heat is extracted and stored in the heat storage vessel. The cooled inert gas is presurized by a compressor and stored in a tank. Subsequently the autoclave is charged by flowing the inert gas from the tank to the autoclave. Gases may flow from the tank through the heat storage vessel or directly into the autoclave to charge it to the desired pressure. A fan circulates gas from the autoclave in heat exchange relationship with the heat storage vessel and back to the autoclave to charge the clave to the desired temperature.

BACKGROUND OF THE INVENTION

Field of the invention

The present invention relates generally to autoclaves and more particularly to a method and apparatus for charging an autoclave with heated, inert gas.

Description of prior art

There is no prior art autoclave system known to applicant that generates inert gas, stores heat from the products of combustion, pressurizes and stores said products at ambient temperature and then utilizes the stored heat to reheat said products for charging an autoclave with inert gas at elevated temperature and pressure. All known prior art systems are relatively inefficient because the heat generated in the production of the inert gas is dissipated in expensive equipment to permit storage at ambient temperature and then additional heat energy must be generated to heat the inert gas when the autoclave is being charged. In addition all known prior art systems are relatively large in size and capacity because they must generate heat at high rates demanded during the short heating portion of the overall cycle. The present invention on the other hand generates inert gas slowly but continuously over the entire period of the cycle, stores heat and gas for rapid use when and as required.

SUMMARY OF THE INVENTION

The autoclave system of the present invention is characterized by a heat storage means and a gas storage tank. A fuel burner is provided on the one end of the heat storage means for producing inert gases. The products of combustion are cooled by being passed through the heat storage means and are stored under pressure in a storage tank. Subsequently the autoclave is charged with the inert gases from the gas storage tank. The gases are then circulated through the heat storage means to heat them to the temperature desired in the autoclave.

Other objects and features of the invention will become apparent from consideration of the following description taken in connection with the accompanying drawings.

DESCRIPTION OF THE DRAWINGS

FIG. 1 is a schematic view of an autoclave system embodying the present invention.

DESCRIPTION OF THE PREFERRED EMBODIMENT

The autoclave system of the present invention includes an autoclave A, a pair of heat storage units U and U' for absorbing heat from products of combustion produced by burners B and B'. The products of combustion are stored at high pressure in a storage tank T but it is necessary to cool the gas before it enters the compressor. When the autoclave A is to be pressurized, the inert gas is passed either back through the heat storage units U or U' or directly to the autoclave. When the inert gas in the autoclave is to be heated the gas is circulated through units U or U'.

The inert gases consist of the products of combustion from burning fuel. The burners receive fuel from tanks 15 through conduits 17 and 19 and a fuel valve 21. Air is supplied to the burners B and B' from a blower 25 through conduits 27 and 29 and an air valve 31. The products of combustion are introduced into the upper portion of the units P and U' through inlets 33.

The heat storage units U and U' are in the form of tanks partially filled with numerous pebbles 35 of metal, refractory, or other heat storage media supported on platforms 31 having a plurality of through air passages. These pebbles 35 have a high ration of surface area to weight and high heat storage capacity whereby the hot products of combustion are cooled as they pass therethrough and the heat therefrom is stored in the pebbles 35.

The bottom of the heat storage units U and U' are formed with inlets 41 which are connected with outlets 42 in the autoclave A by recirculating conduits 43 and 44. The conduit 43 has an isolation valve 45 and a flow control valve 47 installed therein to control gas flow therethrough. Cooling lines 49 are connected with the autoclave outlets 42 and lead to a cooling system (not shown).

A storage tank conduit 51 T's off from the recirculation conduit 44 and joins a conduit 53 extending from the storage tank T. Valves 55 are included in the conduits 51 for isolating unit U or U' from the storage tank T. A discharge valve 57 is connected to the juncture of the conduits 51 and 53 for exhausting gases from the heating units U and U' to enable additional heating of such units after the storage tank T has been filled to capacity. The conduit 53 connects with the inlet of a conventional direct contact heat exchanger or aftercooler 61. The outlet of such aftercooler 61 is connected with a conduit 63 which connects with the inlet of a compressor 65. The outlet of the compressor 65 is connected with a conduit 67 which leads to the storage tank T. The aftercooler 61 is not vital to the operation but does provide a simple means of further cooling the gases and washing them free of dust in order to protect the compressor and to enhance its efficiency.

Return lines 71 and 72 are connected to opposite ends of the storage tank T for returning inert gas therefrom to the individual heat storage units U and U' and autoclave A. Conduits 73 T off from the conduits 71 and 72 and include valves 75 for directing flow into lines 77 returning to the bottom of the heat storage units U and U' and terminating in cold gas inlets 79. By-pass valves 80 permit flow from the return line 71 and 72 through by-pass lines 81 that are connected with the autoclave A whereby the gas from the storage tank T can be introduced directly into the autoclave A thus bypassing the storage units U and U'.

Blowers 82 are privided for blowing air into the bottom of the heat storage units U and U' and out the blow off valves 83 to cool the pebbles 11 when desired. The blowers may be isolated from the system by valves 84.

The temperature of the gases from burners B and B' is high, 3400° F., and must be reduced to a lower temperature, say 1200° F., to permit storage of heat without the use of exotic, expensive materials. This is accomplished by recirculation of gas around U and U'. The gas is pumped by blower systems including a conduit 95 T'd off from the conduits 77 and connected with an inlet valve 97. A conduit 99 connects the inlet valve 97 with a recirculation blower 101, the outlet of such blower being connected with an outlet valve 103 by a conduit 105 and such outlet valve being connected with the respective storage unit U and U' by a conduit 107.

The heat storage units U and U' are provided with hot gas outlets 111 which are connected with autoclave inlets 113 by conduits 115 and 117 and an isolation valve 119. The conduit 117 is connected to a fitting 123 which may receive cooling air from a cooling unit (not shown).

The autoclave A includes an outer shell 125 and a liner 127 arranged concentrically therein. The shell 125 includes a removable end cover 129 for introducing items to be treated into the autoclave A. The upper end of the liner is formed with an inlet 128 and the other end of such liner shrouds a blower including a motor 131 that drives a fan 133 for pulling air through the liner 127 and directing it into the annular space formed between the liner and shell. The liner provides a central chamber for containment of items to be treated in the autoclave and also serves as a duct to facilitate mixing hot and cold gas.

In operation, the heat storage units U and U' are operated alternately to first produce inert gas and store heat and then to reheat the storage gas after introduction into the autoclave A. First, one heat storage unit U is operated to produce inert gas by starting the associated burner B to introduce the resultant products of combustion into the upper portion of the unit U. To this end the fuel and air valves 21 and 31 are opened to provide a stoichiometric mixture of fuel and air to the burner B and such burner is ignited to commence production of gaseous products of combustion inert gases $N_2$, $CO_2$ and $H_2O$. These gases will be at a temperature of 3400° F. which is too hot to permit storage of heat with materials normally available. Accordingly, the recirculation pump 101 is actuated and the inlet and outlet valves 97 and 103, respectively, are opened to commence recirculation of a portion of the products of combustion to effect further cooling of such products to a temperature of say 1200° F. at the top of the pebbles. The gaseous products of combustion pass out the cold air outlet 41 at 70 to 80° F. sufficiently cool to avoid damage to the compressor 65 but in order to further cool the gases and at the same time wash out contaminants the gases are passed through aftercooler and washer 61. The gas is then compressed by the compressor 65 for storage in the storage tank T. As the unit U continues to operate, the top layer of the pebbles 11 will be heated to relatively high temperatures and the temperature front will move gradually down the charge of pebbles 11 until the lowest pebbles begin to heat, at which time the temperature of the gas being discharged from U will begin to rise. At this time the burner B will be stopped and valves 21, 31, 97, 103 and 55 associated with unit U will be closed to isolate U from low pressure components and to permit its use with high pressure gas. The pressurized products stored in the tank T can then be transferred back through the unit U and to the autoclave A to cool the pebbles 11 and heat the gas for affecting the desired temperature in the autoclave A. This is accomplished by opening the return valve 75 and the valve 119 to permit flow from the tank T and through the conduits 71 and 77 in the bottom of the unit U and out the top of such unit and in the autoclave inlet 113. The gas may also be made to flow cold to the autoclave by opening valve 80. In order to heat the gases the fan 133 is operated to circulate the gases within the autoclave A. The valve 45 is opened and the control valve 47 is opened sufficiently to allow approximately one-tenth of the volume of gas circulated by the fan 133 to be recirculated back through the unit U where it will be heated to a high temperature and will pass back into the autoclave inlet 113. The portion of the gas circulated by the fan 133 and not passing through the recirculating valve 47 will travel in the annular space formed between the liner 127 and shell 125 and will mix with the hot gas coming in the inlet 113 at the top of the liner 127. This will cool the hot gas coming in the inlet 113 and will avoid introduction of overheated gas into the autoclave A which may damage products disposed therein for treatment.

Simultaneous with charging of the autoclave A from the heat storage unit U, the heat storage unit U' is operated to introduce additional cooled inert gas into the storage tank T. To this end, the burner B' is ignited and the products of combustion pass through the unit U' and into the storage tank T. When the unit U' becomes sufficiently heated to no longer be effective to cool the products of combustion, the burner B' will be turned off and gas introduced in the reverse direction through the unit U' and from the tank T in the same manner as was described herein above with reference to the heat storage unit U. While the unit U' is introducing heated gaseous products of combustion into the autoclave A, the unit U will again be actuated to produce inert gases from the burner B which will be passed through the unit U and stored in the tank T. The above described alternate operations of the units U and U' will be continued until the autoclave A is charged to the pressure and temperature desired for the particular process to be carried out therein.

Of the steady stated process described above provides an excess of heat but does not provide sufficient inert gas heat may be discharged by cooling the units U and U' by blowing air from the blowers 82 and discharging it out the blow off valves 83.

If during generation of inert gas the storage tank T becomes filled before sufficient heat has been added to the units U or U' the exhaust valve 57 may be opened to discharge the products of combustion produced by the burners B or B', and the particular unit U or U' in operation can continue absorbing heat until the desired temperature is reached.

From the foregoing, it will be apparent that the autoclave system of the present invention provides means for economically and conveniently charging an autoclave with inert gas at a desired elevated temperature and pressure. The heat generated by combustion of fuel to produce the inert gas is conserved for subsequent utilization in heating the products of combustion which have been stored at high pressures. Furthermore the size and capacity of the heat exchange equipment is substantially reduced which results in savings in initial and maintenance costs, simplicity of controls, reduction in nose and atmosphere polution and reduction in heating time if required. An additional advantage is that all heating coils normally used inside the autoclave are eliminated which eliminates risk of spoilage of product because of leaks.

Various modifications and changes may be made with regard to the foregoing detailed description without departing from the spirit of the invention or the scope of the following claims:

We claim:
1. An autoclave system comprising:
   an autoclave having an inlet;
   heat storage means including a hot gas inlet, an outlet, a cold gas inlet and a storage tank port;
   a burner connected with said hot gas inlet;
   a storage tank;

compressor means;

conduit means connecting said outlet of said heat storage means with said autoclave inlet, said storage tank port with the inlet of said compressor, the outlet of said compressor with said storage tank and said storage tank with said autoclave; and control means for selectively directing the gaseous products of combustion from said burner in heat exchange relationship with said heat storage means to cool said products of combustion and store the heat removed, through said compressor for storage under pressure in said storage tank and, thereafter, in heat exchange relationship through said heat storage means to absorb the stored heat and, finally, into said autoclave to charge said autoclave to a predetermined pressure and temperature.

2. An autoclave system as set forth in claim 1 wherein said autoclave includes:

an outlet;

second conduit means connecting said outlet of said autoclave with said heat storage means and including valve means for controlling flow therethrough; and circulating means for circulating said products through said autoclave and in heat exchange relationship with said heat storage means to cause said products to absorb additional heat stored in said storage means.

3. An autoclave system as set forth in claim 1 wherein said heat storage means includes:

a blow off port and a valve for controlling flow therefrom;

a blower for blowing air in heat exchange relationship with said heat storage means and out said blow off port to remove heat from said heat storage means.

4. An autoclave system as set forth in claim 1 wherein said autoclave includes:

a circulating conduit for circulating said products through said heat storage means; and a blower in said conduit for forcing said products therethrough.

5. An autoclave system as set forth in claim 1 that includes:

a blow-off valve in said conduit means interposed between said heat storage means and said storage tank for selectively discharging said products from said heat storage means.

6. An autoclave system as set forth in claim 1 that includes:

a bypass conduit connecting said storage tank with said inlet of said autoclave;

a valve in said bypass conduit for controlling flow therethrough.

7. An autoclave system as set forth in claim 1 that includes:

a second heat storage means including a hot gas inlet, an outlet, a cold gas inlet and a storage tank port;

a second burner connected with said hot gas inlet of said second heat storage means;

second conduit means connecting said outlet of said second heat storage means with said autoclave, said storage tank port with the inlet of said compressor, the outlet of said compressor with said storage tank; and second control means for selectively directing the gaseous products of combustion from said second burner in heat exchange relationship with said second heat storage means to cool said products, through said compressor for storage under pressure in said storage tank and, thereafter, in heat exchange relationship with said second heat storage means to be heated and, finally, into said autoclave.

8. An autoclave system as set forth in claim 1 wherein said autoclave includes:

an outlet, a conduit connecting said outlet to said heat storage means, duct means defining an inlet adjacent said autoclave inlet and extending therefrom to form an outlet adjacent said autoclave outlet; and blower means for blowing said products through said autoclave to circulate a first portion thereof through said heat storage means and a second portion thereof through said duct means whereby said first and second portions will be mixed adjacent said autoclave inlet to cool said first portion.

9. An autoclave system as set forth in claim 8 that includes:

throttling means for controlling the ratio of said first and second portions.

10. A method for charging an autoclave with inert gas, said method comprising the following steps:

burning a fuel to produce a quantity of inert gaseous products of combustion;

passing said products of combustion in heat exchange relationship with means for storing heat therefrom thereby cooling said products and storing heat in said means;

compressing said cooled products in a storage tank;

thereafter, passing said products from said storage tank, in heat exchange relationship with said heat storage means, to heat said products; and introducing the heated products into said autoclave to charge said autoclave to a predetermined pressure and temperature.

11. A method for charging an autoclave as set forth in claim 10 that includes the following steps:

simultaneously with heating said first mentioned quantity of products of combustion, burning a fuel to produce a second quantity of products of combustion;

passing said second quantity of products of combustion in heat exchange relationship with second means for storing heat therefrom to cool said products;

compressing said second quantity of products of combustions in said storage tank;

thereafter, passing said second quantity of product of combustion in heat exchange relationship with said second heat storage means to heat said products; and introducing the heated products into said autoclave.

References Cited

UNITED STATES PATENTS

| 2,121,733 | 6/1938 | Cottrell | 165—4 |
| 2,272,108 | 2/1942 | Bradley | 165—4 |
| 2,759,802 | 8/1956 | Potter et al. | |
| 2,787,530 | 4/1957 | Staiger | 126—116 X |

ROBERT A. O'LEARY, Primary Examiner.

C. SUKALO, Assistant Examiner.

U.S. Cl. X.R.

165—4, 107; 263—15